June 28, 1938.　　C. G. WILLIAMS　　2,121,939
WIRE FIBRIC
Original Filed June 30, 1933
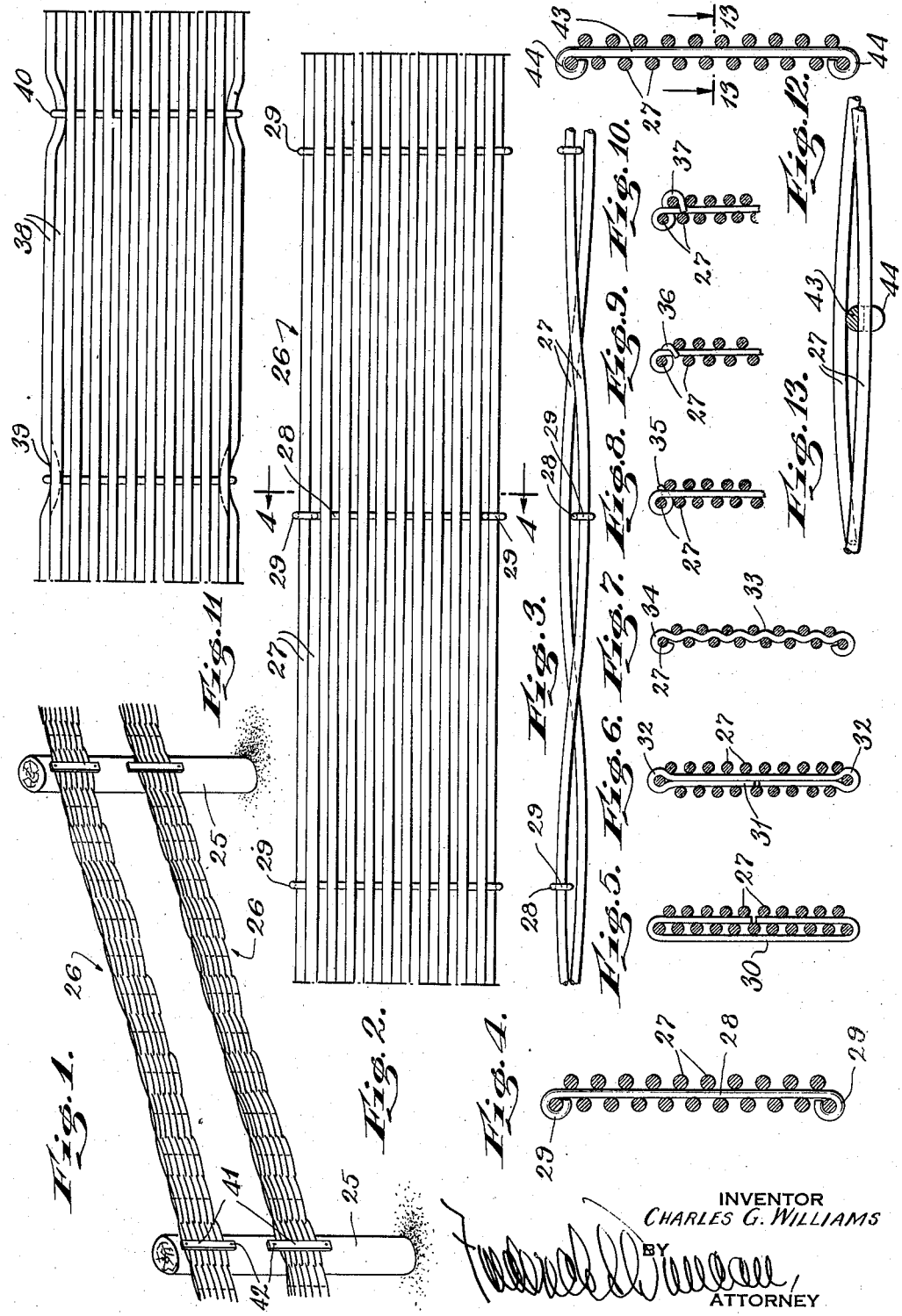
INVENTOR
CHARLES G. WILLIAMS
BY
ATTORNEY Patented June 28, 1938

2,121,939

UNITED STATES PATENT OFFICE 2,121,939

WIRE FABRIC

Charles G. Williams, Fairfield, Conn., assignor to American Chain & Cable Company, Inc., a corporation of New York Original application June 30, 1933, Serial No. 678,321, now Patent No. 2,039,617, dated May 5, 1936. Divided and this application June 24, 1935, Serial No. 28,120. In Canada January 22, 1934

9 Claims. (Cl. 245—11)

The present application is a division of my copending application Serial No. 678,321, filed June 30, 1933, now Patent No. 2,039,617, dated May 5, 1936, and relates to improvements in wire fabric adapted particularly for use in safety guards for highways.

Highway guards when properly constructed serve not merely to confine vehicles to the highway but to safeguard vehicles from wreckage or damage and to protect individuals from injury or loss of life. For this reason, the guard or barrier must whenever possible be of a type which will absorb the energy of impact of a vehicle without serious injury to the vehicle. In other words, the barrier must be capable of yielding to a certain extent under the impact so as to bring the vehicle to a comparatively gradual stop. The extent to which the barrier may safely yield or stretch will vary with different road conditions. In some cases it is necessary to provide much less stretch of the barrier than in other cases, as for instance, on the edge of a steep embankment or bordering a bridge, for if the barrier yields too much the vehicle may drop between the barrier and the edge of the roadway.

Heretofore there have been two general classes of non-rigid barriers: First, barriers that yield by structural deformation; and, second, barriers that provide practically no yield except such as results from elastic or permanent stretch of the material of which they are formed.

In the first class belong the barriers which consist of a broad strip of open mesh wire fabric supported on posts. When a vehicle strikes a barrier of this type, it is caught by the meshes of the fabric. The fabric is elongated under the impact by structural deformation (i. e. by closing of the meshes), and offers a yielding resistance which causes a comparatively gradual arrest of the vehicle. However, the deformation of the fabric by the impact narrows the strip and produces a permanent and unsightly bag or concavity therein which cannot be eradicated. The only way to restore the barrier to its original form is to cut out the deformed portion and replace it with a new section.

In the second class belong barriers consisting of two or more cables strung on posts. Such barriers possess an advantage over barriers of the first class in that they permit of a clean sweep of the wind and will not collect snow, leaves or trash, but they are so unyielding that they are likely to check a vehicle too suddenly. Also, when a vehicle strikes such a barrier the cables tend to ride over the chassis and cut into the superstructure, seriously endangering the occupants of the vehicle. A cable will not grip the vehicle as do the meshes of the fabric type of barriers and the tendency to slip rather than grip is accentuated by the fact that the cable is circular in cross-section.

It is an object of the present invention to provide a third class of barrier which will combine the advantages of the other two and will at the same time overcome their disadvantages. To this end I have devised a barrier which will yield by structural deformation and also by stretch of the material of which it is composed.

A more specific object of the invention is to provide a fabric which is composed of a plurality of tension wires which will close about and grasp an impinging element, but which fabric cannot be narrowed under impact so that after arresting a vehicle there will be no unsightly concavity to be removed and any slack can be taken up by merely pulling the fabric taut.

Preferably my improved barrier is composed of a pair of vertically spaced bands of wire fabric each band corresponding in tensile strength to that of each cable of the ordinary cable barrier, but since in my improved barrier the cable is transformed into a flat ribbon of far greater width than the diameter of the cable there will be no tendency for the band to slip and cut into the vehicle. Another advantage of thus, in effect, spreading out a cable into a flat band is that the barrier is much more conspicuous at night. Furthermore, since there are two spaced tension members there will be no pronounced bag in the barrier after an impact and the individual ribbons may be pulled up separately to restore the barrier to its normal, taut condition.

A further object of the invention is to provide a barrier fabric with contiguous tension wires interwoven with warp wires or pickets so that a face view of the fabric shows substantially no apertures therethrough, although an edge view will show openings between the warp wires at each side of the pickets. Under impact these openings can close only by deformation of the pickets as the tension wires tend to straighten out from their normal sinuous form. Such deformation as occurs results in reducing the thickness of the fabric rather than its width, because the contiguous relation of the tension or warp wires prevents narrowing of the band.

Other objects and advantages of my invention will appear in the following description of a number of embodiments and thereafter the novelty and scope of the invention will be pointed out in the claims.

In the accompanying drawing;

Figure 1 is a fragmental view in perspective of a barrier comprising a pair of tape-like tension members supported on a series of posts;

Fig. 2 is a fragmental side elevation of one of the tension members;

Fig. 3 is a plan view of the same;

Fig. 4 is a view in section taken on the line 4—4 of Fig. 2, showing how the longitudinal elements or warp wires of the tension members are tied together by a weft element;

Figs. 5 to 10 inclusive are views in section similar to that shown in Fig. 4 but illustrating respectively different means for tying the warp wires together;

Fig. 11 is a view similar to Fig. 2 showing a slightly modified form or tape-like tension member;

Fig. 12 is a view in section similar to Fig. 4, but showing a fabric formed with weft elements of half round wire; and Fig. 13 is a view in section taken on the line 13—13 of Fig. 12.

As shown in Fig. 1 my highway guard comprises a series of posts 25 and a pair of metal bands 26 secured thereto and stretched therebetween. Any suitable means for fastening the bands to the posts may be employed. As illustrated the metal bands are clamped to the posts by means of clamping plates 41 which are fastened to the posts by lag screws 42.

Each band or tape-like tension member 26 as shown in Figs. 2, 3 and 4 comprises a plurality of longitudinal tension elements or warp wires 27 which are united at intervals by transverse pickets or weft wires 28 interwoven between the warp wires. The pickets are held in place by bending them about the top and bottom warp wires, as indicated at 29 in Fig. 4.

A modification of the construction shown in Fig. 4 is illustrated in Fig. 5. Here the weft wires are doubled over and form loops 30 which embrace all the warp wires on one side of the shed, the opposite ends of the loop 30 lying within the shed formed between the warp wires.

In the modification shown in Fig. 6 a picket 31 is used which lies wholly within the shed between the warp wires except at the top and bottom where it passes about the top and bottom warp wires as indicated at 32.

When a vehicle strikes my improved barrier the warp wires act like fingers to close about and grasp the impinging parts so that the barrier will not slip and increase the hazards of the impact as will a cable or a solid metal ribbon. While the grasping action is a favorable feature of the open mesh type of barrier there is this important difference that less deformation is possible with my barrier and such as does occur will be comparatively inconspicuous and will result in reducing the thickness of the fabric rather than its width.

In all of the structures so far described it will be noted that the warp wires are in contact one with another at the points where they cross, midway between the pickets. Hence, a face view of the fabric shows no openings therethrough, but when viewed edgewise, as in Fig. 3, openings appear between the warp wires at each side of each picket. Under an impact these openings may be closed by actual deformation of the pickets, somewhat after the manner indicated in Fig. 7, where the picket 33 is bent to a zig-zag or undulating form by tension of the warp wires. In other words, the fabric is flattened by the impact. If desired, the fabric may be made with pickets of the type shown in Fig. 7, so as to flatten the sinuosities of the warp wires and render the fabric less yielding and so that the pickets will aid in preserving the spacing of the warp wires. The undulations of the pickets form seats for warp wires and will maintain the warp wires against transverse displacement in the plane of the fabric even in cases where the warp wires are not contiguous.

There are various ways in which the weft wire 28 may be secured to the marginal warp wires 27. In Fig. 4, the loops 29 are substantially closed about the warp wires 27. In Fig. 8 each loop is extended so that it has a terminal portion 35 projecting between the marginal warp wire and the next adjacent warp wire. In the construction shown in Fig. 9, the weft wire is not only looped about the marginal warp wires but is also twisted around the body of the weft wire as indicated at 36 so as to provide a more secure hold of the weft wire upon the warp wire. Fig. 10 shows a still further modification in which the weft wire is formed with an "S-shaped" terminal portion 37 which is coiled about the marginal warp wire in one direction and then is passed in the opposite direction about the next adjacent warp wire.

The modification shown in Fig. 11 is very similar to that shown in Fig. 2, differing therefrom only in the fact that the marginal warp wires 38 are formed with indentations 39 at intervals and the weft wires 40 are anchored to the marginal warp wires in these indentations. This fixes the marginal weft wires against longitudinal displacement but the intermediate wires may slip under impact to form a pocket about the impacting part. The weft wires 40 may be secured to the warp wires 38 in any of the various ways illustrated in Figs. 4 to 10 inclusive.

Obviously, in the constructions shown in Figs. 2 to 11 inclusive the number and size of warp wires will determine the strength of the barrier and will be proportioned to give a predetermined strength. The wires may be of round, half-round or rectangular section as desired. For example, in Figs. 12 and 13, I show a fabric which differs from that shown in Figs. 2, 3 and 4 only in the fact that it is provided with pickets 43 of half-round stock. The pickets are thus of heavier cross-section per separation of warp wires, and because the pickets are flat on one side they may be more easily bent around the marginal warp wires as shown at 44.

I have described a number of different forms of tape-like tension members which may be used in my improved highway guard or barrier. However, these are to be taken as illustrative and not limitative of my invention, and I wish it to be understood therefore that I reserve the right to make such changes in form and structure as fall within the spirit and scope of the claims.

I claim:

1. A fabric of the character described comprising a plurality of contiguous round warp wires and a plurality of weft wires interwoven therewith, each weft wire being fixed at opposite ends thereof to the warp wires at opposite margins of the fabric.

2. A fabric of the character described comprising a plurality of contiguous round warp wires, a plurality of weft wires interwoven therewith, certain of the warp wires being fastened to the weft wires and others of the warp wires being free to slide lengthwise relatively to the weft wires.

3. A fabric of the character described comprising a plurality of warp wires, a plurality of weft wires interwoven therewith, certain of the warp wires being fastened to the weft wires and others of the warp wires being free to slide lengthwise relatively to the weft wires, the weft wires being formed with seats adapted to slidably support the relatively slidable warp wires against transverse displacement.

4. A fabric of the character described comprising a plurality of warp wires, a plurality of weft wires interwoven therewith, certain of the warp wires being fastened to the weft wires and others of the warp wires being free to slide lengthwise relatively to the weft wires, the weft wires being formed with permanent bends in the front and rear sides thereof to serve as seats for slidably supporting the relatively slidable warp wires against transverse displacement.

5. A fabric of the character described comprising a plurality of warp wires and a plurality of weft wires interwoven therewith, each weft wire being twisted in one direction about a marginal warp wire and in opposite direction about a second warp wire immediately adjacent the said marginal warp wire.

6. A fabric of the character described comprising a plurality of contiguous warp wires and a plurality of weft wires interwoven therewith, each weft wire being twisted in one direction about a marginal warp wire and in opposite direction about a second warp wire immediately adjacent the said marginal warp wire.

7. A fabric of the character described comprising a plurality of warp wires and a plurality of weft wires interwoven therewith, each weft wire being secured at each end thereof to a marginal warp wire, said marginal wires being indented at the points of attachment of the weft wires thereto, the intervening warp wires being free to slide longitudinally but not vertically with respect to the weft wires.

8. A fabric of the character described comprising a plurality of contiguous round warp wires and a plurality of weft wires interwoven therewith, each weft wire being secured at each end thereof to a marginal warp wire, said marginal wires being indented at the points of attachment of the weft wires thereto.

9. A fabric of the character described composed of warp wires and transverse weft wires interwoven therewith, each weft wire being of half-round stock and being looped about the warp wires at opposite margins of the fabric.

CHARLES G. WILLIAMS.